(12) United States Patent
Coppens et al.

(10) Patent No.: US 8,022,116 B2
(45) Date of Patent: Sep. 20, 2011

(54) LIGHTWEIGHT RIGID STRUCTURAL COMPOSITIONS WITH INTEGRAL RADIATION SHIELDING INCLUDING LEAD-FREE STRUCTURAL COMPOSITIONS

(75) Inventors: Daniel D. Coppens, Avondale, PA (US); Martin John Lilley, Toronto, CA (US); John B. Jones, Oxford, PA (US)

(73) Assignee: Advanced Shielding Components, LLC, Avondale, PA (US)

( * ) Notice: Subject to any disclaimer, the term of this patent is extended or adjusted under 35 U.S.C. 154(b) by 1879 days.

(21) Appl. No.: 10/891,789

(22) Filed: Jul. 14, 2004

(65) Prior Publication Data

US 2009/0224184 A1    Sep. 10, 2009

Related U.S. Application Data

(60) Provisional application No. 60/488,674, filed on Jul. 18, 2003.

(51) Int. Cl.
*G21F 1/10* (2006.01)
(52) U.S. Cl. ......... 523/136; 524/439; 524/440; 524/441
(58) Field of Classification Search .................. 523/136; 524/439–441
See application file for complete search history.

(56) References Cited

U.S. PATENT DOCUMENTS

| | | | |
|---|---|---|---|
| 3,514,607 A * | 5/1970 | Webster | 250/519.1 |
| 4,157,476 A | 6/1979 | O'Connor | |
| 4,563,494 A | 1/1986 | Ida | |
| 4,587,277 A | 5/1986 | Sato | |
| 4,619,963 A | 10/1986 | Shoji | |
| 4,795,654 A | 1/1989 | Teleki | |
| 4,938,233 A | 7/1990 | Orrison, Jr. | |
| 5,237,930 A | 8/1993 | Belanger et al. | |
| 5,245,195 A | 9/1993 | Shah et al. | |
| 5,247,182 A | 9/1993 | Servant et al. | |
| 5,278,219 A | 1/1994 | Lilley et al. | |
| 5,304,792 A | 4/1994 | Verat et al. | |
| 5,321,272 A | 6/1994 | Granfors et al. | |
| 5,523,581 A | 6/1996 | Cadawalader | |
| 5,548,125 A | 8/1996 | Sandbank | |
| 5,550,383 A | 8/1996 | Haskell | |
| 5,883,938 A | 3/1999 | Gerth et al. | |
| 5,908,884 A | 6/1999 | Kawamura et al. | |
| 6,048,379 A | 4/2000 | Bray et al. | |
| 6,153,666 A | 11/2000 | Lagace | |
| 6,281,515 B1 | 8/2001 | DeMeo et al. | |
| 6,310,355 B1 | 10/2001 | Cadwalader | |
| 6,459,091 B1 | 10/2002 | DeMeo et al. | |
| 6,517,774 B1 | 2/2003 | Bray et al. | |
| 6,548,570 B1 | 4/2003 | Lange | |
| 6,550,964 B2 | 4/2003 | Guerit et al. | |
| 6,619,842 B1 | 9/2003 | Artig et al. | |
| 6,674,087 B2 | 1/2004 | Cadwalader et al. | |
| 6,828,578 B2 | 12/2004 | DeMeo et al. | |
| 6,841,791 B2 | 1/2005 | DeMeo et al. | |
| 2003/0027005 A1 | 2/2003 | Elliott | |
| 2003/0161751 A1 | 8/2003 | Elliott | |
| 2003/0164063 A1 | 9/2003 | Elliott | |
| 2003/0168637 A1 | 9/2003 | McCord | |
| 2004/0147652 A1 | 7/2004 | Lemer | |

FOREIGN PATENT DOCUMENTS

| | | |
|---|---|---|
| AU | 626944 B2 | 5/1990 |
| DE | 19955192 A1 | 5/2001 |
| DE | 10234159 C1 | 11/2003 |
| EP | 0370812 A2 | 5/1990 |
| EP | 0371699 | 6/1990 |
| EP | 0371699 A1 | 6/1990 |
| EP | 0372758 A1 | 6/1990 |

OTHER PUBLICATIONS

Yaffe, Martin J., et al., *Composite Materials For X-Ray Protection*, Health Physics, vol. 60, No. 5, pp. 661-664, May 1991.

* cited by examiner

*Primary Examiner* — Edward J Cain
(74) *Attorney, Agent, or Firm* — Brian A. Gomez; Gomez Int'l Patent Office, LLC

(57) ABSTRACT

Lightweight and rigid, leaded or lead-free integral radiation shielding structural compositions comprising two or more radiation attenuating elements or compounds thereof, selected for having compatible radiation attenuating characteristics, dispersed in a thermoplastic or thermoset resin. The radiation shielding structural compositions of the present invention can be used to functionally and structurally replace lead-lined structures in medical and industrial x-ray systems. The radiation shielding structural compositions of the present invention can also be formulated to minimize the density of the resulting structure.

42 Claims, 3 Drawing Sheets

LIGHTWEIGHT RIGID STRUCTURAL COMPOSITIONS WITH INTEGRAL RADIATION SHIELDING INCLUDING LEAD-FREE STRUCTURAL COMPOSITIONS

CROSS-REFERENCE TO RELATED APPLICATION

This application claims the benefit of U.S. Provisional Application No. 60/488,674 filed Jul. 18, 2003.

BACKGROUND OF THE INVENTION

X-radiation is a powerful and commonly used tool in modern society. Specifically, x-radiation is commonly used as a diagnostic tool in medical and industrial (non-destructive testing) fields. However, exposure to radiation can be damaging to human health. In order to protect users, patients and x-ray technicians, steps have been taken to limit their exposure to x-rays. For example, flexible x-radiation attenuating materials worn as protective aprons have been created in order to protect patients and technicians alike. In addition, x-radiation equipment has been designed to incorporate with shielding properties to reduce x-radiation exposure from the source generator.

In the field of x-ray equipment, shielding is required or mandated to reduce leakage of stray radiation to below specified maximum levels. Most shielded components of such equipment, such as x-ray tube housings, intensifier housings, collimators and filter devices, typically use a structural outer layer of metal for mechanical strength. This structural component is commonly machined, cast or forged aluminum, brass or steel. Since the aluminum, brass or steel is effectively radiolucent, the structural component is subsequently lined with a second layer of a material, such as lead, for radiation shielding. The lead shielding is typically held in place with an adhesive or by mechanical means, forming a multi-layer final structure with one layer providing strength and structure and the second layer providing x-radiation shielding.

Lead is often the material of choice used for x-radiation shielding in medical and industrial x-ray equipment because it is low in cost and readily available. The use of lead, however, poses significant manufacturing challenges as well as health and environmental hazards. There are two major disadvantages of using lead for radiation shielding: toxicity and the heavy weight of the material. The toxicity of lead has been shown to pose significant health risks to humans. Those adversely affected can include both those involved in processing and those using shielding materials and equipment. The environmental impact resulting from the disposal of products containing lead is also well established and a serious modern-day concern.

In order to limit lead exposure to humans, many industrialized nations regulate industries that use lead, including x-ray equipment manufacturers. In an effort to control, reduce or eliminate the use of lead, many industrialized nations have eliminated the manufacture and use of lead in products such as gasoline and paint. More recently, there has been a general determination to minimize the exposure of workers in plants which now use lead and, more importantly, to shield the general public from the adverse effects from lead in products and equipment and from the toxic waste resulting from the ultimate disposal of lead-containing products at the end of their useful life. The toxicity hazard can result from direct exposure to lead itself or indirectly: from exposure to an extractable source through groundwater leachate from landfills (Ref. US EPA Toxicity Leachate Characteristic Procedures, "TCLP", under US RCRA legislation); from solid residues; or from gaseous emissions from waste incineration. The determination to eliminate lead and certain other toxic materials from all electrical equipment, including x-ray equipment, has been established in a European toxic waste elimination directive known as "W.E.E.E." (Waste Electrical and Electronic Equipment Initiative, 2000/C365/E13) (Jul. 28, 2000).

Not only is lead toxic, but also it is a heavy material that can add significant weight to components such as those required in x-ray equipment. As discussed previously, conventional x-ray equipment contains a lead liner to shield against x-radiation. The excessive weight of lead is especially troublesome because of the mass of lead shielding required to meet mandated radiation leakage standards. Thus, the mass of lead used is a significant proportion of the overall weight of x-ray equipment. Existing manufacturing techniques, which typically involve lining of a separate cast or machined metal structural housing with elemental lead, significantly increase the weight of such equipment. Due to the use of lead, current shielded components are relatively inefficient in terms of mass. They are heavy and complex because the structural metal housing provides insignificant radiation attenuation while the lead shielding, having poor mechanical strength, cannot provide a structural function.

Heavy weight is a significant disadvantage for certain types of x-radiation equipment including portable equipment, such as "C-arm" x-ray diagnostic machines, and for equipment whose shielding components are moving or rotating, such as CT tube housings. In CT tube housings, rotational speeds are limited by inertial forces, which are in turn, dependent on their mass. In these applications, for rotational balance, overall shielding mass is further increased by the need for counterweights to preserve static balance. Lighter shielding components allow lower counterweight mass, which can further result in smaller and lighter supporting structures. Therefore, lowering the weight of the shielded structure can have an overall beneficial effect on the size, weight, cost and portability of x-ray units. Reduced mass can also permit higher rotational speeds of moving parts limited by inertial forces. In CT imaging, for example, reduced mass of the moving parts, especially of the tube head and housing, could permit faster revolution speed, which would lower image acquisition time and/or improve image definition.

While providing adequate shielding at reduced weight is important, replacement components must still fit existing precise equipment designs and keep overall unit size to a minimum. To keep the volume of the structure small, components having high attenuation and also high density are often preferable.

Although mandated radiation leakage testing is usually performed at the worst-case conditions of the peak applied voltage of the machine (typically 70 kVp to 80 kVp for dental x-ray units; 120 kVp to 150 kVp for medical x-ray units; 140 kVp to 160 kVp for CT tube housings; and up to and above 200 kVp for industrial units) shielding must be effective along the entire range of beam energies emanating from the x-ray unit. Shielding components on the receiving end of the radiation, such as intensifier housings, are tested using radiation from the highest voltage from the direct source beam even though they receive only a degraded, filtered and scattered spectrum of radiation in actual practice. Effective substitutes for lead must, therefore, shield radiation not only at the peak voltage of the machine but also along the entire effective range of beam energies and spectra.

Several attempts have been made to create materials that provide acceptable shielding properties but which are lightweight, lead-free or both. For instance, flexible x-ray shielding materials have been available for many years and have been discussed by Yaffe, et al. (Health Physics, Vol. 60, No. 5). Yaffe discussed combining metals with flexible elastomers in order to produce lighter weight radiation protection aprons than those made from similar lead-powder filled rubbers or polymers. These compositions, however, are limited to flexible materials and do not anticipate incorporation of complementary metals into resins in order to create lightweight and rigid, lead-free integral radiation shielding structures.

Recently, there have been attempts to replace only the lead shielding lining of x-ray equipment with lead-free polymer compositions using a single attenuating element. U.S. Pat. No. 4,157,476 to O'Conner describes a shielding material for a dental x-ray tube consisting of a shielding liner composed of barium sulfate filled polymers. This lead sheeting replacement is contained in and acts as a liner in a conventional structural metal housing. The polymer structure in O'Conner simply replaces the lead, while still requiring a layered structure with separate housing as in conventional equipment. Furthermore, the barium sulfate filled resins are implicitly proposed only for shielding dental tube heads which operate at low kVp (below 80 kVp) where barium is an effective x-radiation absorber. Such a shield would be highly ineffective in terms of mass per unit area relative to lead at the higher kVs found in most medical x-ray units. Although barium in elemental form, is more attenuation efficient than lead per unit mass up to about 100 kVp, in actual practice, one would require higher mass for equivalent attenuation. Higher mass would be required because barium is not available in unreactive elemental form, or in useful high concentration alloy form. Barium sulfate, the only available non-toxic barium salt, contains 41% deadweight of radiolucent sulfate, and has low density which prevents high concentration by weight in compounding. Furthermore, the resulting very low composition density would create much thicker shielding liners, on the order of several times thicker than lead for equivalent shielding.

More recently, there have been several additional attempts, both using lead and lead-free formulations, to combine structural and shielding functions in a monolithic polymeric composition. However, these only teach the use of one element for attenuation. For example, U.S. Pat. No. 5,304,792 to Verat describes an x-ray image intensifier tube casing with the outside structural component made from a molded thermoplastic resin loaded with a shielding material such as lead oxide. This technology is specific to intensifier tube housings and uses a single metal or metal oxide (preferably PbO) in an injection moldable thermoplastic resin.

Lead-free filled polymer shielding compositions using only a single attenuating element are also described in U.S. Pat. No. 6,048,379 to Bray et al., which teaches the use of tungsten as the attenuating element in a binder. Bray teaches the use of such material as a lead replacement for use in traditional lead applications, such as projectiles, where density equivalents is desired. Bray also claims tungsten powder in a broad variety of resins formed into articles used for radiation shielding, including housings. Single element-based attenuators such as tungsten have a lower shielding efficiency relative (per unit mass) to lead, or conversely require greater elemental mass than lead for equal shielding at most normal medical beam energies, which typically range from 50 kVp to 150 kVp. Single element based attenuators have a lower shielding efficiency due to a number of factors. In the case of tungsten, with the use of energy beams up to 120 kVp, a significant portion of the beam energy spectrum, including the typical emission spike from conventional tungsten-based anodes, falls in the 55 keV to 69 KeV "K-edge" tungsten window causing poor attenuation. At elevated beam energies, such as 120 kVp to 150 kVp, or at lower kVp but with high beam filtration, the attenuation coefficient of tungsten is simply well below that of lead, both overall, and for the greater part of the beam spectrum. Therefore, the tungsten/resin compositions of Bray do not anticipate and cannot produce shielding or complete monolithic shielded components lighter in weight than elemental lead when used for radiation protection.

Single element-based attenuating compositions, such as those using barium or tungsten, also exhibit a large variability in their shielding efficiency (per unit mass), along the radiation spectrum, compared to lead. None of the above-cited references addresses this issue, nor do cited test data reflect the existence of this shielding factor variability with beam energy and spectra. In addition, a frequent commercial requirement of such compositions and their components is flame retardancy without the use of toxic or hazardous flame retardants. While the use of such flame retardant agents in polymer compositions is known in the art, their introduction to highly filled, dense shielding compositions requires volumetric space. The use of flame retardant agents displaces and reduces the maximum permissible filler loading of attenuating elements, thereby reducing composition density and adding slightly to the required mass of composition for equivalent shielding in an integral structure.

While there have been several attempts at creating lead-free x-ray shielding materials, there remains a need for lightweight and rigid, lead-free, integral, monolithic radiation shielding structures. There is a further need for such x-radiation shielding structures that can shield radiation over a wide range of energies between 50 kVp and 150 kVp, and even up to 200 kVp. The present invention solves the afore-mentioned problems and provides complex molded x-radiation shielding components with varying densities that can be formulated to provide structural strength with x-radiation shielding.

SUMMARY OF THE INVENTION

This invention provides lightweight radiation shielding structural compositions, which combine the structural and radiation shielding functions in an integral and monolithic structural composition. Another object of this invention is the reduction or elimination of lead from radiation shielding structural compositions. Yet another objective is the production of radiation shielding structural compositions that have fire retardant properties. Yet another object of the present invention is the production of radiation shielding structural compositions with low density.

Specifically, the present invention provides lightweight and rigid, lead-free, integral radiation shielding structural compositions comprising at least two radiation shielding elements in elemental or alloyed form, or compounds thereof, having complementary radiation attenuation characteristics, dispersed in a thermoset or thermoplastic resin. The present invention provides both lead-free compositions and those containing lead.

More specifically, the present invention provides lightweight and rigid, lead-free integral radiation shielding structural compositions comprising at least two radiation shielding elements selected from the group consisting of antimony, bismuth, iodine, tungsten, tin, tantalum, erbium and barium, or salts, compounds or alloys thereof dispersed in a thermoplastic or thermoset resin that can shield x-rays having energies between 50 kVp and 200 kVp, preferably between 100 kVp and 160 kVp, more preferably between 120 kVp and 150 kVp.

The present invention provides components of complex shapes and varying thicknesses. The present invention also provides formulations that include various fillers or bulking agents for creating components requiring greater strength and reduced densities.

DETAILED DESCRIPTION OF THE INVENTION

Figure 1:
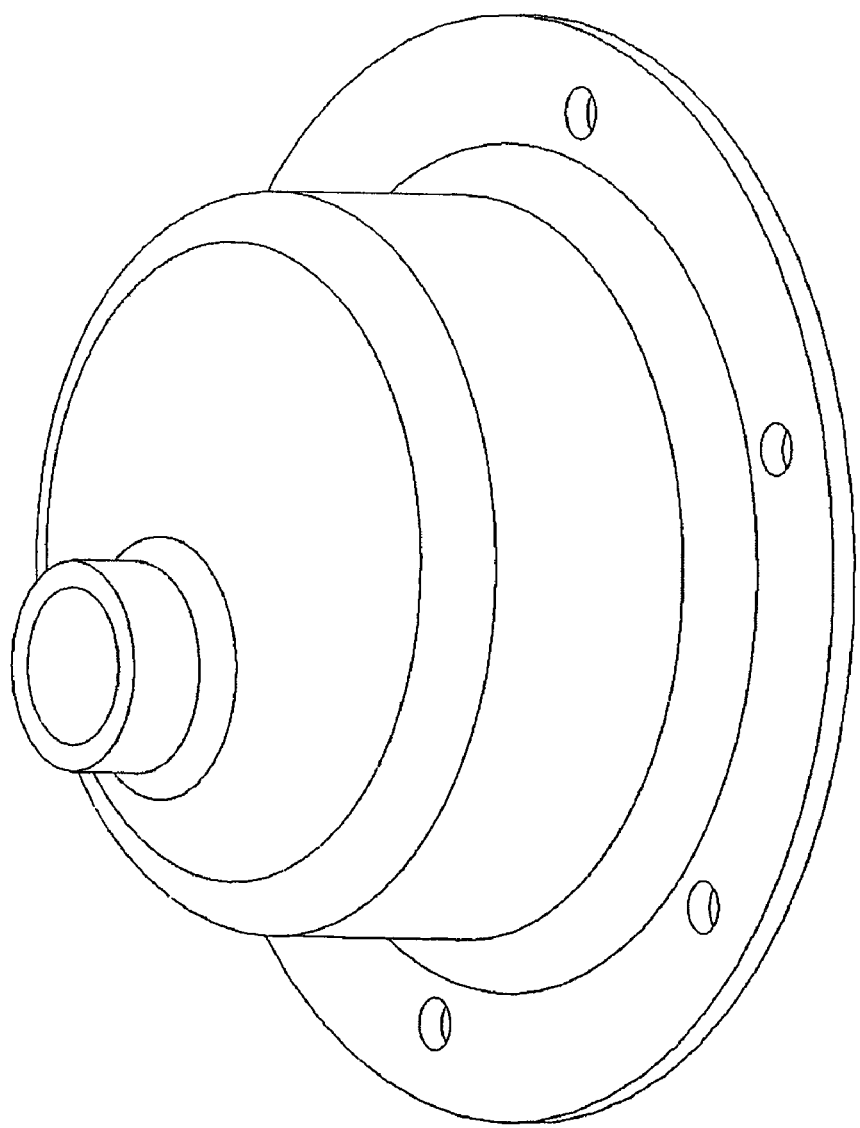
FIG. 1 illustrates a molded structure of the present invention.

The present invention is based on the discovery of a group of lead-free and leaded compositions, using two or more specific combinations of radiation attenuation-compatible powdered elements, salts, compounds or alloys thereof, of medium to high density which are mixed with a resin or polymeric carrier or binder at a high filler loading. Each element provides a unique pattern of attenuation versus radiation energy. Combining compatible elements results in a composition with a greater attenuation per unit mass than the individual elements alone.

Shielding mass is reduced both by the use of mixtures of powders of elements with complementary radiation attenuating characteristics which have lower combined unit mass at equal shielding properties to lead, and by the forming of those elements in a resin matrix into monolithic rigid components having suitable mechanical and structural strength properties. The overall mass of composition, per unit area, is significantly below the mass of lead required for equivalent shielding, and is even lighter in mass, per unit area, than the whole shielded housing structure of conventional equipment consisting of lead sheet lined aluminum.

The present invention provides lightweight and rigid, integral radiation shielding structural compositions comprising at least two radiation attenuating elements or compounds thereof, selected for having complementary radiation attenuating characteristics, dispersed in a thermoplastic or thermoset resin. Such compositions, when formed, shaped or molded into complete components have adequate mechanical properties such as rigidity, tensile and flexural properties and impact strength. Resulting components can have a flexural modulus of from about 300 to about 30,000 MPa and preferably from about 3,000 to about 7,000 MPa. The resulting components can have an ultimate tensile strength of from about 20 MPa with a preferred strength of from about 30 MPa.

Formed compositions of the present invention can replace both layers of a desired component, the lead shielding and the supporting structure, with a single-layer, monolithic structural material having integral shielding and having a density such that the thickness is within the range of 25% to 200% of equivalent lead-aluminum housing structures. The resulting structures of the present invention have a preferred density of from about 3.5 g/cc.

With the appropriate selection of different combinations of elements, a range of compositions can provide such lower-mass per unit area components to function at different peak energies, as kVp, and having application over the commonly used broad energy ranges below the design peak of the equipment. Such compositions can be flame-retarded as required, for example to provide adequate V-0 per UL 94 tests, while maintaining such lower shielding mass efficiency and, when formed, can be machined, drilled, painted, etc. as required in the commercial use of such components. By appropriate selection of resin matrix, as commonly known in the art, such compositions can form components which can operate at the elevated temperatures required in pressurized, oil-filled x-ray tube housings. The components can withstand physical or chemical degradation of mechanical properties caused by immersion in such commonly used cooling fluids. Components of the present invention can also perform within acceptable resin degradation limits caused by irradiation commonly found with medical or dental x-ray equipment.

Structural compositions of the present invention are formulated using a resin component, at least two x-radiation attenuating elements and in some preferred formulations, fillers, reinforcing fibers and other ingredients such as fire or smoke retardants. For consistency and clarity, all ingredients are shown in weight % and elemental weight %. The resin component and the preferred filler components are presented first in each preferred structural composition. The balance of materials is presented next and includes the amounts of attenuating elements. For example, if the resin amount is 20%, then the balance of the structural composition comprises 80% of the overall weight. Of that 80% balance, the structural composition comprises various proportions of attenuating elements. Thus, if the attenuating elements comprise 50% tungsten and 50% bismuth, the amount of tungsten and bismuth each equals 50% of the 80% overall weight balance (or 40% of the overall weight of the structural composition).

While the specific elements can be incorporated in elemental or alloyed form or as salts, oxides and compounds thereof, the overall elemental proportion is determined after deducting the resin weight and any dead weight radiolucent cations, such as salt components, radiolucent alloying metals, reinforcing fibers, bulking filler materials or fire and smoke retardants. For example, if a structural composition comprises 10 g of resin and 90 g of tin oxide, with the oxide comprising 10% of the tin oxide, then the resulting elemental weight % of the tin component is 90 g×0.90 or 81 g.

The lead-free formulations of the present invention teach the use of several combinations of two or more x-radiation attenuating elements selected for having complementary K-edge radiation attenuating characteristics, including antimony, bismuth, iodine, tungsten, tin, tantalum, erbium and barium in elemental or alloyed form or compounds thereof, in specific weight proportions. Since each element has a specific attenuation, the selection of elements depends upon the desired attenuation in the resulting component. For example, if two elements were selected with similar attenuation characteristics, the resulting component would have roughly the same attenuation of the individual elements. Conversely, by selecting complementary elements, a resulting composition can have improved attenuation per unit mass. Lightweight leaded compositions can be formulated in the same manner. In these formulations, lead substitutes for bismuth at the same weight proportion as defined for bismuth.

In addition to complementary attenuation characteristics, the elements are selected with compatible particle size distribution to provide maximum packing fraction and minimum filler volume according to techniques known in the art.

The specific weight proportions will depend upon the desired attenuation and other performance characteristics. The specific elements can be added in elemental or alloyed form or compounds thereof including salts and oxides. The choice of elements consists of selecting at least one element from at least two different groups. For example, one x-radiation shielding structure of the present invention includes from about 10% to about 85% in elemental weight % of at least one element selected from the group consisting of antimony, tin, barium and iodine; and from about 15% to about 90% in elemental weight % of at least one element selected from the group consisting of bismuth, tungsten, tantalum and erbium.

The selected combination of elements are then mixed with an appropriate resin and molded, cast or formed into a radiation shielding structure. As one skilled in the art is readily aware, the specific choice of resin depends upon the desired formulation and handling characteristics and curing requirements. The resin, or copolymer thereof, can be at least one selected from the group consisting of epoxies, vinyl esters, unsaturated polyesters, phenolics, polyesters, polyamides, polyarylether ketones, polyether ether ketones, polysulfones, poly aryl sulfones, acrylics, polyimides, polyethylene, polypropylene, polyether imides, polyvinylidene fluoride, acrylonitrile-butadiene-styrene, polyurethanes, ethylene copolymers, poly vinyl chlorides, silicones, polycarbonates, polyphenyleneoxide, polycyanates, cyanate esters, bismaleimides and acetals. Preferred embodiments include from about 5% to about 20% by weight resin with a more preferred resin amount of from about 7% to about 12%.

In addition, the resin, filler loading and particle size and distribution were selected and designed using known techniques such that the effective viscosity of the mixture was low enough to permit homogeneous mixing while permitting air release and adequate flow during molding. The viscosity was high enough to prevent settling out of the higher-density fillers during both mixing and molding.

In order to improve final structural or mechanical properties, glass, other fiber reinforcement or other fillers known in the art can be added to the resin. Typical fiber reinforcement is 5-30 phr, but to avoid taking up too much resin volume, is preferably limited to 5-20 phr, and more preferably limited to 5-10 phr. The fiber reinforcement can be at least one selected from the group consisting of glass, carbon fiber, boron fiber, steel, tungsten, aramid, ultra-high molecular weight polyethylene and polybenzoxazole. Other fillers such as fumed silica, microballoons, or other lightweight non-structural additives can be added to the formulation to manipulate the ultimate density of the structure. Preferred lower density formulations use from about 5% to about 30% resin and up to about 30% by weight non-attenuating fillers.

Other desirable functions, such as magnetic shielding or electrical conductivity, can be achieved by incorporating mu-metal or conducting elements, such as high conductivity carbon nano-fibers, into the component during the molding process.

The present invention can also incorporate non-toxic and non-hazardous flame and smoke retardant compounds, without adding significant mass or lowering shielding properties. Non-toxic flame retardants which can be used include, but are not limited to aluminum trihydrate, magnesium hydroxide, zinc borate and other salts of boric acid. A single retardant can be used as well as a mixture of more than one retardant.

Figure 2:
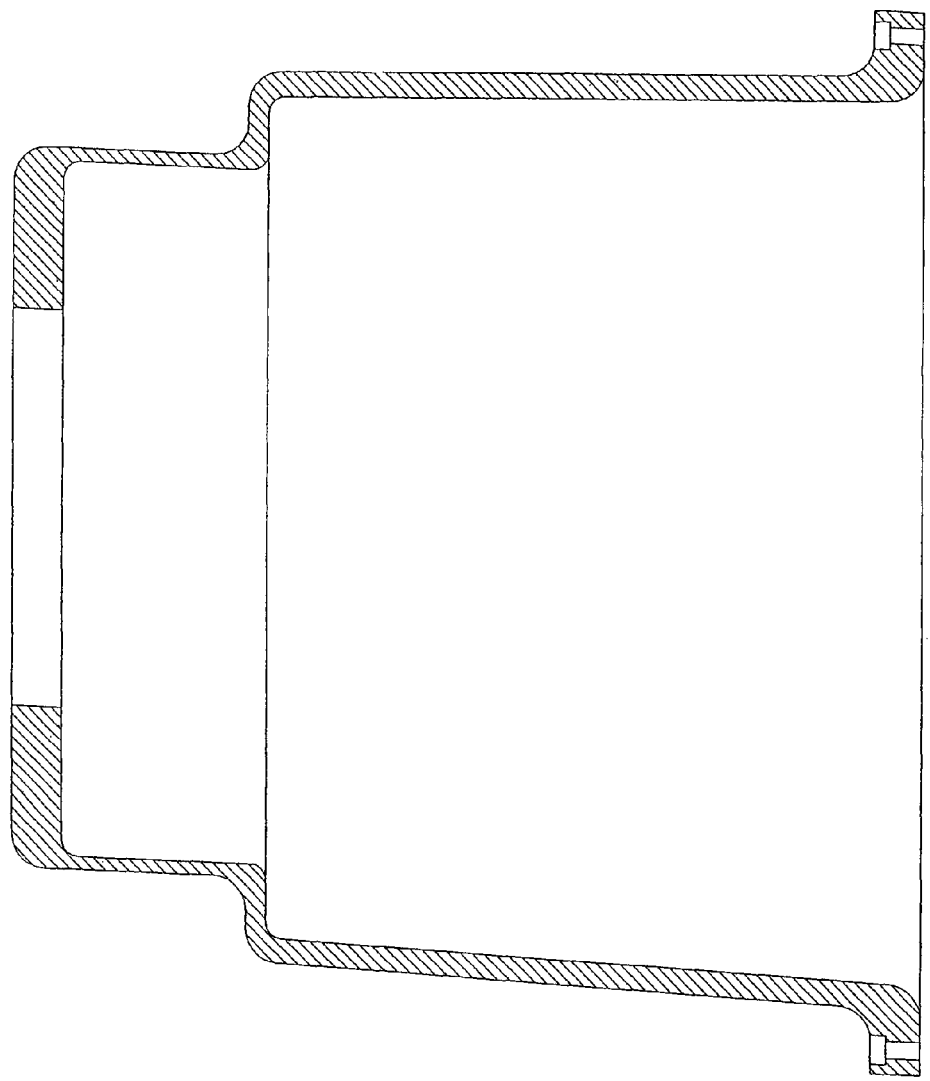
FIG. 2 is a cross sectional view of a molded structure of the present invention.
Figure 3:
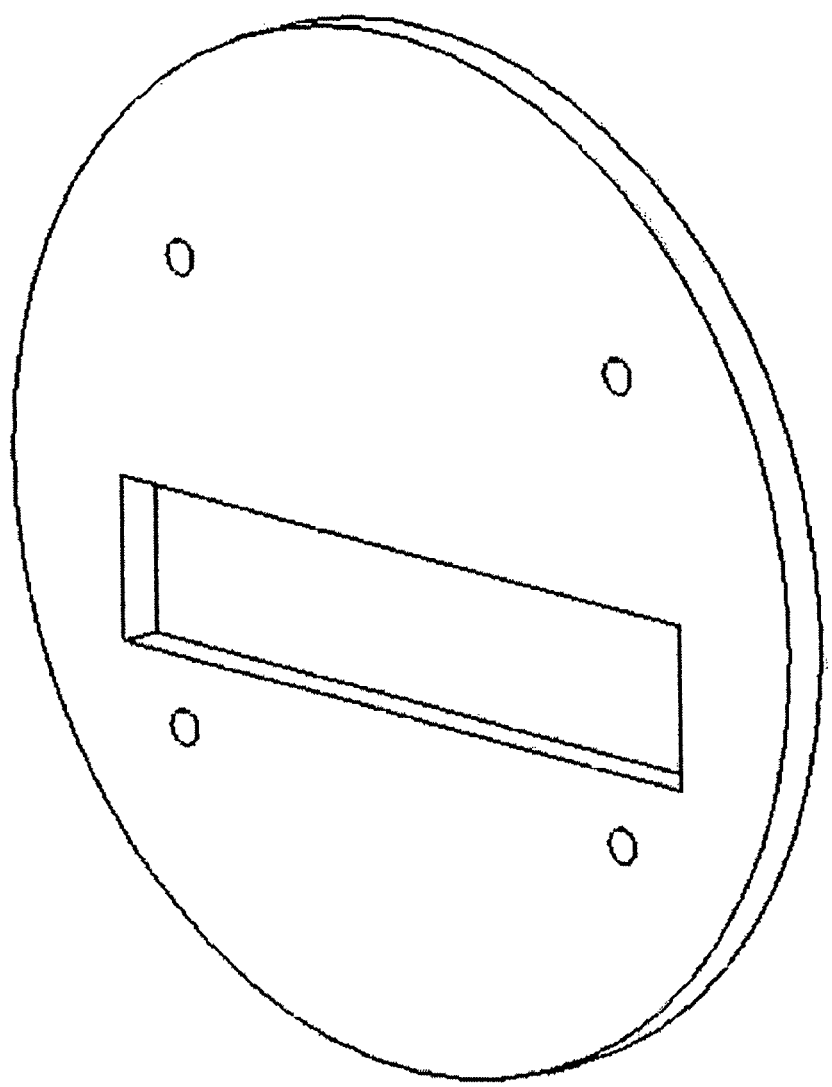
FIG. 3 illustrates a molded structure of the present invention.

While x-ray equipment is used herein as an example, the compositions of the present invention can be molded or machined into essentially any shape where shielding is desired. FIG. 1 illustrates a CT Tube cathode end cap/cable connector cover. The end cap cover is a one-piece molded component made from x-radiation shielding material of the present invention. FIG. 2 illustrates a cross-section of an image intensifier housing molded from material described in this patent. The figure demonstrates the varying wall thickness that can be produced. FIG. 3 illustrates a CT beam shaper component molded from the material of the present invention and demonstrates the machinability of the material of the present invention. The materials of the present invention can be molded and then precisely drilled or shaped.

The ability to form a single monolithic structure with built-in shielding properties also simplifies the manufacturing process by eliminating the handwork required to manufacture and combine several different and separate components of the structure such as the casing, lead liner, and the magnetic and/or electrical shielding.

Although the principal applications and weight-saving benefits are envisaged where such structures are provided to shield x-radiation, the principles and teachings can extend to shielding certain gamma radiation, particularly those from commonly used radionucleides in nuclear medicine, such as Cs-131, I-125, Am-241, Tl-201, Hg-197, Co-57, Tc-99m and I-131, with the majority of the radionucleide energy below 200 KeV. Such structures include, but are not limited to, vials, boxes, transport pouches and syringe covers. Other products include gamma ray protective devices for the handling, transport and use of radioactive isotopes used in nuclear medicine. Additionally such structures can shield against the bremsstrahlung secondary x-radiation created by high-energy beta radiation emitted from beta-emitting radiochemicals such as Yttrium-90, for example in syringe covers, or for combination gamma/beta emitters. In addition, components made from the compositions of the present invention can be used for shielding against x-radiation and/or gamma radiation in the nuclear industry, for physics research or in radiation therapy.

It should also be understood, that while the greatest weight savings and minimum component thickness occur at maximum attenuating filler loadings, in certain circumstances, for example to modify mechanical structure properties, or to match existing housing wall thickness or exact volume and shape for existing fittings, it may be necessary to compromise this optimum loading by dilution with additional resin or bulking fillers, or both. This thickness bulking, where required, adds little additional overall structure weight, and such matched dimension components still exhibit significant mass-savings over the lead shielding alone, and even greater mass-savings when compared to complete lined housings.

The present invention is further illustrated by the following examples.

Example 1

This example shows a dense and lead-free, highly-filled, two-element composition with varying thickness.

Two attenuating elements in powder form including 70% by weight antimony, and 30% by weight tungsten were mixed together. The elements were selected with compatible particle size distribution to provide maximum packing fraction and minimum filler volume according to techniques known in the art. The powdered elements were homogeneously mixed with an epoxy resin such that the filler volume represented 50% by volume of the total composition.

The mixed composition was compression molded into a series of sheets of different thickness. Each sheet was then divided into samples and tested for radiation shielding properties and for physical and mechanical properties using standard ASTM methods.

| Sample 1 | |
|---|---|
| Thickness | 3.1 mm |
| Density | 4.7 gm/cc |
| Shielding values | 1.45 mm Pb @ 120 kVp, HVL 7.6 mm Al |
| Ult. Tensile Strength | 5100 psi (35 Mpa) |
| Break Elongation | 1.7% |
| Flex Modulus (10% D) | 1,500,000 psi (10300 Mpa) |
| Mass per unit area | 15.0 kg/sq m |
| Mass of equivalent lead sheet | 16.44 kg/sq m |

The 3.1 mm thick sample was designed for comparison to an x-ray intensifier housing conventionally made as a 2 mm layer of aluminum lined with 1 mm sheet lead. The conventionally made housing provides a lead attenuation equivalence of 1.39 mm Pb. Such intensifiers are commonly operated with primary beam energies in the range 90 kVp to 120 kVp, which after filtration, degradation and scattering approximate to 80 kVp to 110 kVp beams. Sample 1, a single layer measuring 3.1 mm, had excellent rigidity and mechanical properties and had shielding values equivalent to lead sheeting at lower mass. Although the example was made as a flat sheet, the composition was suitable for molding into any complex thin walled shape and can be molded as a replacement for a conventional x-ray intensifier housing or any desired component.

This same composition, molded to 2.2 mm thickness, had shielding performance equivalent to a 1 mm Pb lead sheet (at 100 kVp) and weighed 10.2 kg/sq m. The 2.1 mm sample was 10% lower mass per unit area than 1 mm of Pb (11.34 kg/sq m) and 39% lighter in mass than the total housing structure of 1 mm lead plus 2 mm aluminum (16.74 kg/sq m, with average density of 5.58 gm/cc). Its thickness (2.2 mm) is higher than the shielding thickness of lead (1 mm) but less than the 3 mm complete housing thickness. For a cylindrical intensifier housing having a typical shielded area of 0.3-0.5 sq m of material, this composition would reduce overall equipment weight by approximately 2-4 kg, excluding any counterweights, permit a reduced structure (e.g. in a "C-Arm" configuration) and improve portability. This composition would have application in similar medical x-ray machine components, operated at similar kVp, such as filter/collimator housings and shutters.

Example 2

This example shows the effect of filler loading on the mechanical properties of the formed composition and alternative forming techniques. A lead-free, two-element filled composition, as in Example 1, was prepared and tested in the same manner. The loading of metallic powdered elements in this example was 36% by volume. The mixture was poured (cast) into a flat mold for plaques, which were cut up and tested as in Example 1. The epoxy resin used was the same as in Example 1, having a mix viscosity of 580 cps (@72 F) and a pot-life of 21 minutes.

| Sample 2 | |
|---|---|
| Thickness | 3.18 mm |
| Density | 3.67 gm/cc |
| Shielding values | 1.1 mm Pb @ 120 kVp, HVL 6.41 |
| Ult. Tensile Strength | 5360 psi (37 Mpa) |
| Break Elongation | 3.3% |
| Flex Modulus (10% D) | 960,000 psi (6620 Mpa) |

-continued

| Sample 2 | |
|---|---|
| Sample Mass per unit area | 11.67 kg/sq m |
| Mass of equivalent lead sheet | 12.47 kg/sq m |
| Mass of 1 mm Pb/2 mm Al | 16.74 kg/sq m |

Sample 2 had adequate flexural modulus and mechanical strength as well as greater toughness and impact strength than Sample 1 from Example 1. This sample survived a drop test and still demonstrated mass benefits compared to conventional lead shielded structures. The resulting sample was 7% lighter in weight than 1 mm lead shielding and 33% less area weight than 1 mm lead lined 2 mm aluminum.

Despite the high filler loading, the mechanical properties were much closer to that of unfilled resin, which has a tensile strength of 7300 psi, elongation of 4.5%, and flex modulus of 450,000 psi.

Example 2-A

A lead-free composition, as in Example 2, was prepared and tested in the same manner. The loading of metallic fillers in this example was 36% by volume, but with added chopped glass fiber at 10% by volume of resin. The mixture was pressed into plaques, which were cut up and tested as in Examples 1 and 2. The samples showed improved mechanical strength properties, with greater tensile and flexural strengths and increased flexural modulus

Example 3

This example shows the minimum optimized weight vs. shielding for an antimony-tungsten system (for 100 kVp beam energy). A lead-free, two-element filled composition was prepared and tested in the same manner as Example 1. The loading of the antimony and tungsten metallic fillers was 55% by volume in this example. The epoxy resin system was changed for better mechanical properties and greater pot-life and the compound was flame-retarded using ATH. The final structure was painted. The composition comprised:

| | |
|---|---|
| Antimony | 61.2% wt |
| Tungsten | 26.2% wt |
| Radiopaque pigment | 1.4% wt |
| ATH | 1.0% wt |
| Epoxy Resin | 10.2% wt |

The test data is shown below:

| | Sample 3 |
|---|---|
| Thickness | 1.8 mm |
| Density | 5.01 gm/cc |
| Shielding values | 1.0 mm Pb @ 85 kVp, Filter 1 mm Al |
| | 1.0 mm Pb @ 100 kVp, Filter 1 mm Al |
| | 0.74 mm Pb @ 120 kVp, Filter 1 mm Al |
| | 0.63 mm Pb @ 140 kVp, Filter 1 mm Al |
| Ult. Tensile Strength | 7530 psi (52 Mpa) |
| Flexural Strength | 13650 psi (94 Mpa) |
| Flex Modulus | 1520000 psi (10480 Mpa) |
| Mass per unit area | 9.01 kg/sq m |
| Mass of equivalent lead sheet | 11.34 kg/sq m |
| Mass of 1 mm Pb/2 mm Al | 16.74 kg/sq m |
| Average Density of 1 mm Pb/ 2 mm Al | 5.58 gm/cc |

The resulting component showed a 20% mass saving compared to a 1 mm lead sheet, and a 46% mass saving compared to a housing constructed of 1 mm lead lining 2 mm aluminum with equivalent shielding. The sensitivity to beam energy, kVp, also demonstrates the necessity to customize the selection of attenuating elements and their proportions for shielding against specific beam energies (kVp), in this case 90-120 kVp, suitable for intensifiers and fluoroscopy collimators and filter components operating at or below this limit. There is a clear decrease in shielding value (lead equivalence) at the higher energies tested, making it unsuitable for shielding at high energies, due to the increased weight required. In the above example, to operate at 140 kVp would require 14.3 kg/sq m of this material, instead of the 9.01 required at 100 kVp, making this composition 26% heavier than the lead equivalent and only 15% lighter than a 1 mm lead-lined 2 mm aluminum housing with equivalent shielding performance.

Examples 4A and 4B

These examples show alternative element systems of equal compound density and volumetric filler loading, using tin and bismuth in ratios suitable for 100 kVp energy beams. Two alternative, two-element filled, compositions comparable to Examples 1 in weight and shielding performance in the 90-120 kVp range were prepared and tested, in the same manner as Example 1, using tin and bismuth metallic fillers in different ratios, 55/45% wt and 65/35% wt respectively, with the attenuating fillers 40% by volume of the compound and using a vinyl ester resin system, the second sample, 4-B, being glass reinforced. The compositions were:

|  | Sample 4-A | Sample 4-B |
| --- | --- | --- |
| Tin | 46.25% wt | 53.00% wt |
| Bismuth | 37.85% wt | 28.50% wt |
| Epoxy resin | 15.90% wt | 14.30% wt |
| Glass fiber chop | 0% wt | 4.20% wt |
| Thickness | 2.72 mm | 2.80 mm |
| Density | 3.9 gm/cc | 3.9 gm/cc |
| Shielding values | 1.0 mm Pb | 1.0 mm Pb @ 100 kVp, |
| Mass per unit area | 10.7 kg/sq m | 11.04 kg/sq m |
| Mass of equivalent lead sheet | 11.34 kg/sq m | |
| Mass of 1 mm Pb/ 2 mm Al | 16.74 kg/sq m | |
| Average density of 1 mm Pb/2 mm Al | 5.58 gm/cc | |

The resulting plaques were comparable in weight and shielding performance to Example 1 and showed a 3-6% mass saving compared to 1 mm of lead; and a 34-36% mass savings compared to a 1 mm lead-lined 2 mm aluminum housing with equivalent shielding performance. This example demonstrates that for certain shielding requirements for certain beam energies, there are options as to selection and combinations of elements, in different ratios which can result in similar weight-shielding performance, but may have different costs. Although these samples were made using powders of each individual metal, since tin-bismuth alloys are widely commercially available in these metallic proportions, it would be possible to substitute the corresponding alloy in similar finely divided form with the same result.

Since lead and bismuth are adjoining elements in the periodic table, and have correspondingly similar radiation attenuation characteristics per unit mass, lead can be substituted for bismuth in both of the above formulations if a non lead-free composition is required or permitted. Since the density of lead, 11.34 gm/cc is slightly higher than that of bismuth, 9.7 gm/cc, such equivalent leaded compositions would have slightly lower volume and higher density and corresponding less thickness for equal area mass and shielding value. Alternatively, the leaded-filler volume proportion can be equalized to maintain mechanical properties.

These examples and the foregoing description are illustrative of this invention. It is understood that those skilled in the art may devise alternatives to those discussed. The present invention is intended to embrace all such alternatives that fall within the scope of the following claims.

We claim:

1. A lightweight and rigid, lead-free, integral radiation shielding structural composition comprising at least two radiation shielding elements in elemental or alloyed form, or compounds thereof, having complementary radiation attenuation characteristics, dispersed in a thermoset or thermoplastic resin and further comprising at least one flame retardant.

2. The lightweight and rigid, lead-free integral radiation shielding structural composition of claim 1 that can shield x-rays having energies from about 100 kVp to about 200 kVp.

3. The lightweight and rigid, lead-free integral radiation shielding structural composition of claim 2 that can shield radiation equivalent to from about 0.50 mm to about 6 mm lead.

4. The lightweight and rigid, lead-free integral radiation shielding structural composition of claim 1 wherein the radiation shielding elements are selected from the group consisting of antimony, bismuth, iodine, tungsten, tin, tantalum, erbium, barium and alloys or compounds thereof.

5. The lightweight and rigid, lead-free integral radiation shielding structural composition of claim 1 that is dense and comprises:

A) from about 5% to about 20% by weight resin; and the balance of the structural composition comprising;

B) from about 10% to about 85% in elemental weight % of at least one element selected from the group consisting of antimony, tin, barium and iodine; and C) from about 15% to about 90% in elemental weight % of at least one element selected from the group consisting of bismuth, tungsten, tantalum and erbium.

6. The lightweight and rigid, lead-free integral radiation shielding structural composition of claim 5 that is dense and comprises:

A) from about 7% to about 12% by weight resin; and the balance of the structural composition comprising;

B) from about 15% to about 80% in elemental weight % of at least one element selected from the group consisting of antimony, tin, barium and iodine; and C) from about 20% to about 85% in elemental weight % of at least one element selected from the group consisting of bismuth, tungsten, tantalum and erbium.

7. The lightweight and rigid, lead-free integral radiation shielding structural composition of claim 1 that is dense and comprises:

A) from about 5% to about 20% by weight resin; and the balance of the structural composition comprising;

B) from about 15% to 60% in elemental weight % of at least one selected from the group consisting of erbium, tungsten and tantalum; and C) from about 40% to about 85% in elemental weight % of bismuth.

8. The lightweight and rigid, lead-free integral radiation shielding structural composition of claim 7 that is dense and comprises:
A) from about 7% to about 12% by weight resin; and the balance of the structural composition comprising;
B) from about 25% to 50% in elemental weight % of at least one selected from the group consisting of erbium, tungsten and tantalum; and
C) from about 50% to 75% in elemental weight % of bismuth.

9. The lightweight and rigid, lead-free integral radiation shielding structural composition of claim 1 that is dense and comprises:
A) from about 5% to about 20% by weight resin; and the balance of the structural composition comprising;
B) at least two elements, alloys or compounds thereof, selected from at least two different groups consisting of;
i) antimony, tin, barium and iodine;
ii) erbium, tungsten and tantalum; and
iii) bismuth.

10. The lightweight and rigid, lead-free integral radiation shielding structural composition of claim 9 that is dense and comprises:
A) from about 5% to about 20% by weight resin; and the balance of the structural composition comprising;
B) at least two elements selected from at least two different groups consisting of;
i) up to about 85% in elemental weight % of at least one selected from the group consisting of antimony, tin, barium and iodine;
ii) up to about 50% in elemental weight % of at least one selected from the group consisting of erbium, tungsten and tantalum; and
iii) up to about 90% in elemental weight % of bismuth.

11. The lightweight and rigid, lead-free integral radiation shielding structural composition of claim 10 that is dense and comprises:
A) from about 7% to about 12% by weight resin; and the balance of the structural composition comprising;
B) at least two elements selected from at least two different groups consisting of;
i) up to about 30% in elemental weight of at least one selected from the group consisting of antimony, tin, barium and iodine;
ii) up to about 40% in elemental weight of at least one selected from the group consisting of erbium, tungsten and tantalum; and
iii) from about 30% to about 90% in elemental weight of bismuth.

12. The lightweight and rigid, lead-free integral radiation shielding structural composition of claim 10 that is dense and can shield x-rays having energies from about 101 kVp to about 129 kVp, comprising:
A) from about 5% to about 20% by weight resin; and the balance of the structural composition comprising;
B) from about 40% to about 80% in elemental weight of at least one selected from the group consisting of tin and antimony; and
C) the balance comprising at least one selected from the group consisting of tungsten, bismuth and tantalum.

13. The lightweight and rigid, lead-free integral radiation shielding structural composition of claim 10 that is dense and can shield x-rays having energies from about 130 kVp to about 150 kVp, comprising:
A) from about 5% to about 20% by weight resin; and the balance of the structural composition comprising;
B) from about 15% to about 60% in elemental weight of at least one selected from the group consisting of tungsten and tantalum; and
C) the balance comprising bismuth.

14. The lightweight and rigid, lead-free integral radiation shielding structural composition of claim 1, that is lighter in weight than conventional lead-lined aluminum or polymer housings, per unit area, with equivalent or superior x-ray shielding compared to lead.

15. The lightweight and rigid, lead-free integral radiation shielding structural composition of claim 1, wherein the structural composition has a flexural modulus of from about 3000 to about 30,000 MPa.

16. The lightweight and rigid, lead-free integral radiation shielding structural composition of claim 1 wherein the flame retardant is at least one selected from the group consisting of non-toxic smoke retardant and non-toxic flame retardant.

17. The lightweight and rigid, lead-free integral radiation shielding structural composition of claim 16 wherein the flame retardant is at least one selected from the group consisting of aluminum trihydrate, magnesium hydroxide and zinc borate.

18. The lightweight and rigid, lead-free integral radiation shielding structural composition of claim 1 wherein the resin, or copolymer thereof, is at least one selected from the group consisting of epoxies, vinyl esters, unsaturated polyesters, phenolics, polyesters, polyamides, polyarylether ketones, polyether ether ketones, polysulfones, poly aryl sulfones, acrylics, polyimides, polyethylene, polypropylene, polyether imides, polyvinylidene fluoride, acrylonitrile-butadiene-styrene, polyurethanes, ethylene copolymers, poly vinyl chlorides, silicones, polycarbonates, polyphenyleneoxide, polycyanates, cyanate esters, bismaleimides and acetals.

19. The lightweight and rigid, lead-free integral radiation shielding structural composition of any one of claims 1, 3, 4, 5, 7, 11, 14, 15 or 18 further comprising from about 5 to about 30 phr fiber or particle reinforcement.

20. The lightweight and rigid, lead-free integral radiation shielding structural composition of claim 19 wherein the fiber reinforcement is at least one selected from the group consisting of glass, carbon fiber, boron fiber, steel, tungsten, aramid, ultra-high molecular weight polyethylene and polybenzoxazole.

21. A lightweight and rigid, integral radiation shielding structural composition comprising at least two radiation shielding elements in elemental or alloyed form, or compounds thereof, having complementary radiation attenuation characteristics, dispersed in a thermoset or thermoplastic resin further comprising at least one flame retardant.

22. The lightweight and rigid, integral radiation shielding structural composition of claim 21 that can shield radiation equivalent to from about 0.50 mm to about 6 mm lead.

23. The lightweight and rigid, integral radiation shielding structural composition of claim 21 wherein the radiation shielding elements are selected from the group consisting of antimony, bismuth, lead, iodine, tungsten, tin, tantalum, erbium, barium and alloys or compounds thereof.

24. The lightweight and rigid, integral radiation shielding structural composition of claim 21 that is dense and comprises:
A) from about 5% to about 20% by weight resin; and the balance of the structural composition comprising;
B) from about 10% to about 85% in elemental weight % of at least one selected from the group consisting of antimony, tin, barium and iodine; and C) from about 15% to about 90% in elemental weight % of at least one selected from the group consisting of bismuth, lead, tungsten, tantalum and erbium.

25. The lightweight and rigid, integral radiation shielding structural composition of claim 24 that is dense and comprises:
A) from about 7% to about 12% by weight resin; and the balance of the structural composition comprising;
B) from about 15% to about 80% in elemental weight % of at least one selected from the group consisting of antimony, tin, barium and iodine; and
C) from about 20% to about 85% in elemental weight % of at least one selected from the group consisting of bismuth, lead, tungsten, tantalum and erbium.

26. The lightweight and rigid, integral radiation shielding structural composition of claim 21 that is dense and comprises:
A) from about 5% to about 20% by weight resin; and the balance of the structural composition comprising;
B) from about 15% to about 60% in elemental weight % of at least one selected from the group consisting of erbium, tungsten and tantalum; and
C) from about 40% to about 85% in elemental weight % of at least one selected from the group consisting of bismuth and lead.

27. The lightweight and rigid, integral radiation shielding structural composition of claim 26 that is dense and comprises:
A) from about 7% to about 12% by weight resin; and the balance of the structural composition comprising;
B) from about 25% to about 50% in elemental weight % of at least one selected from the group consisting of erbium, tungsten and tantalum; and
C) from about 50% to about 75% in elemental weight % of at least one selected from the group consisting of bismuth and lead.

28. The lightweight and rigid, integral radiation shielding structural composition of claim 21 that is dense and comprises:
A) from about 5% to about 20% by weight resin; and the balance of the structural composition comprising;
B) at least two elements, alloys or compounds thereof, selected from at least two different groups consisting of;
i) antimony, tin, barium and iodine;
ii) erbium, tungsten and tantalum; and
iii) bismuth and lead.

29. The lightweight and rigid, integral radiation shielding structural composition of claim 28 that is dense and comprises:
A) from about 5% to about 20% by weight resin; and the balance of the structural composition comprising;
B) at least two elements selected from at least two different groups consisting of;
i) up to about 85% in elemental weight % of at least one selected from the group consisting of antimony, tin, barium and iodine;
ii) up to about 50% in elemental weight % of at least one selected from the group consisting of erbium, tungsten and tantalum; and
iii) up to about 90% in elemental weight % of at least one selected from the group consisting of bismuth and lead.

30. The lightweight and rigid, integral radiation shielding structural composition of claim 29 that is dense and comprises:
A) from about 7% to about 12% by weight resin; and the balance of the structural composition comprising;
B) at least two elements selected from at least two different groups consisting of;
i) up to about 30% in elemental weight of at least one selected from the group consisting of antimony, tin, barium and iodine;
ii) up to about 40% in elemental weight of at least one selected from the group consisting of erbium, tungsten and tantalum; and
iii) from about 30% to about 90% in elemental weight of at least one selected from the group consisting of bismuth and lead.

31. The lightweight and rigid, integral radiation shielding structural composition of claim 29 that is dense and can shield x-rays having energies from about 101 kVp to about 129 kVp, comprising:
A) from about 5% to about 20% by weight resin; and the balance of the structural composition comprising;
B) from about 40% to about 80% in elemental weight % of at least one selected from the group consisting of tin and antimony; and
C) the balance comprising at least one selected from the group consisting of tungsten, bismuth, lead and tantalum.

32. The lightweight and rigid, integral radiation shielding structural composition of claim 29 that is dense and can shield x-rays having energies from about 130 kVp to about 150 kVp, comprising:
A) from about 5% to about 20% by weight resin; and the balance of the structural composition comprising;
B) from about 15% to about 60% in elemental weight of at least one selected from the group consisting of tungsten and tantalum; and
C) the balance comprising at least one selected from the group consisting of bismuth and lead.

33. The lightweight and rigid, integral radiation shielding structural composition of claim 21, that is lighter in weight than conventional lead-lined aluminum or polymer housings, per unit area, with equivalent or superior x-ray shielding compared to lead.

34. The lightweight and rigid, integral radiation shielding structural composition of claim 21, wherein the structural composition has a flexural modulus of from about 3000 to about 30,000 MPa.

35. The lightweight and rigid, integral radiation shielding structural composition of claim 21 wherein the flame retardant is at least one selected from the group consisting of non-toxic smoke retardant and non-toxic flame retardant.

36. The lightweight and rigid, integral radiation shielding structural composition of claim 35 wherein the flame retardant is at least one selected from the group consisting of aluminum trihydrate, magnesium hydroxide and zinc borate.

37. The lightweight and rigid, integral radiation shielding structural composition of claim 21 wherein the resin, or copolymer thereof, is at least one selected from the group consisting of epoxies, vinyl esters, unsaturated polyesters, phenolics, polyesters, polyamides, polyarylether ketones, polyether ether ketones, polysulfones, poly aryl sulfones, acrylics, polyimides, polyethylene, polypropylene, polyether imides, polyvinylidene fluoride, acrylonitrile-butadiene-styrene, polyurethanes, ethylene copolymers, poly vinyl chlorides, silicones, polycarbonates, polyphenyleneoxide, polycyanates, cyanate esters, bismaleimides and acetals.

38. The lightweight and rigid, integral radiation shielding structural composition of any one of claims 21, 22, 23, 24, 26, 30, 33, 34, or 37 further comprising from about 5 to about 30 phr fiber or particle reinforcement.

39. The lightweight and rigid, integral radiation shielding structural composition of claim 38 wherein the fiber reinforcement is at least one selected from the group consisting of glass, carbon fiber, boron fiber, steel, tungsten, aramid, ultra-high molecular weight polyethylene and polybenzoxazole.

40. The lightweight and rigid, integral radiation shielding structural composition of claim 21 wherein the composition comprises lead in elemental or alloyed form, or compounds thereof.

41. The lightweight and rigid, integral radiation shielding structural composition of claim 38 wherein the composition comprises lead in elemental or alloyed form, or compounds thereof.

42. The lightweight and rigid, integral radiation shielding structural composition of claim 38 wherein the composition comprises lead in elemental or alloyed form, or compounds thereof and wherein the flame retardant is at least one selected from the group consisting of non-toxic smoke retardant and non-toxic flame retardant.

* * * * *